Figure 1:
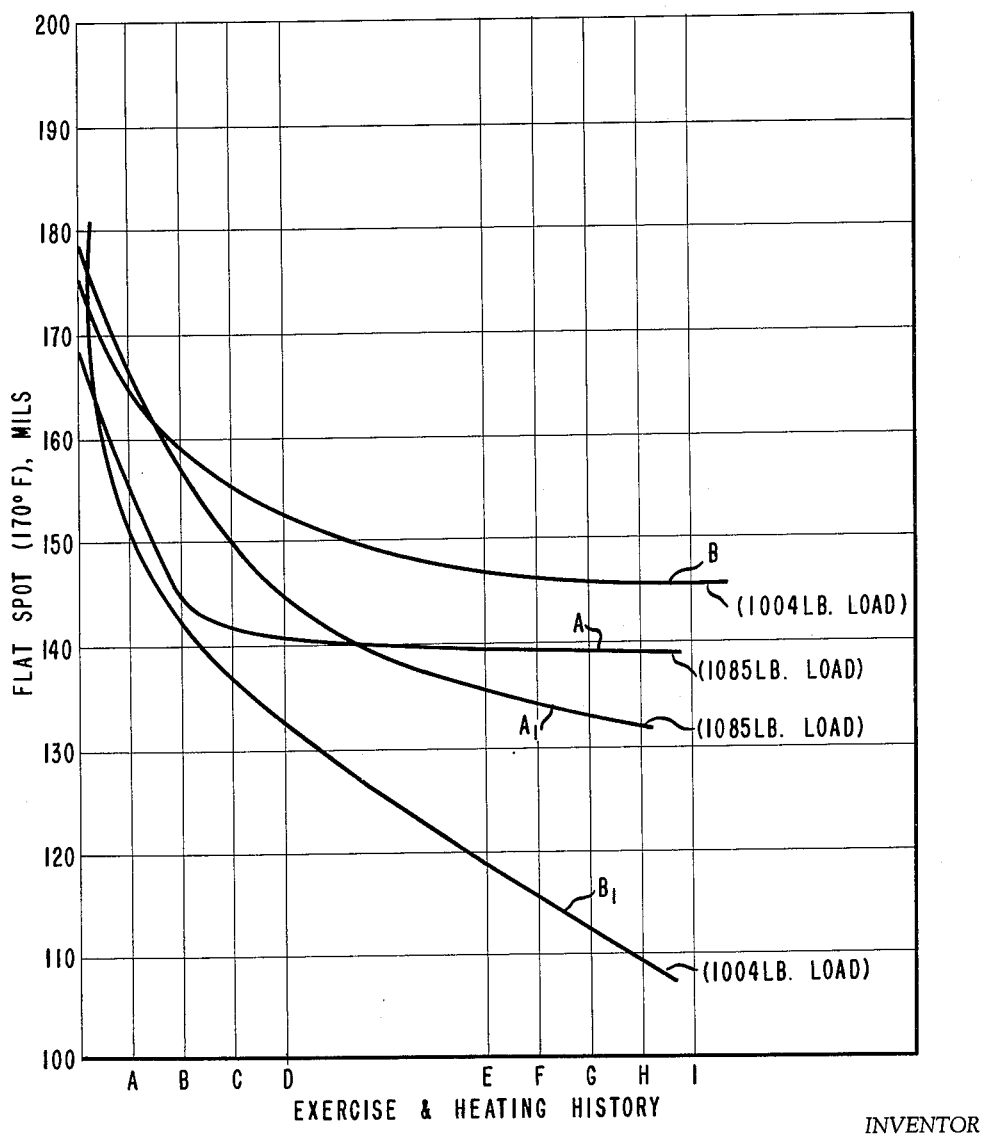

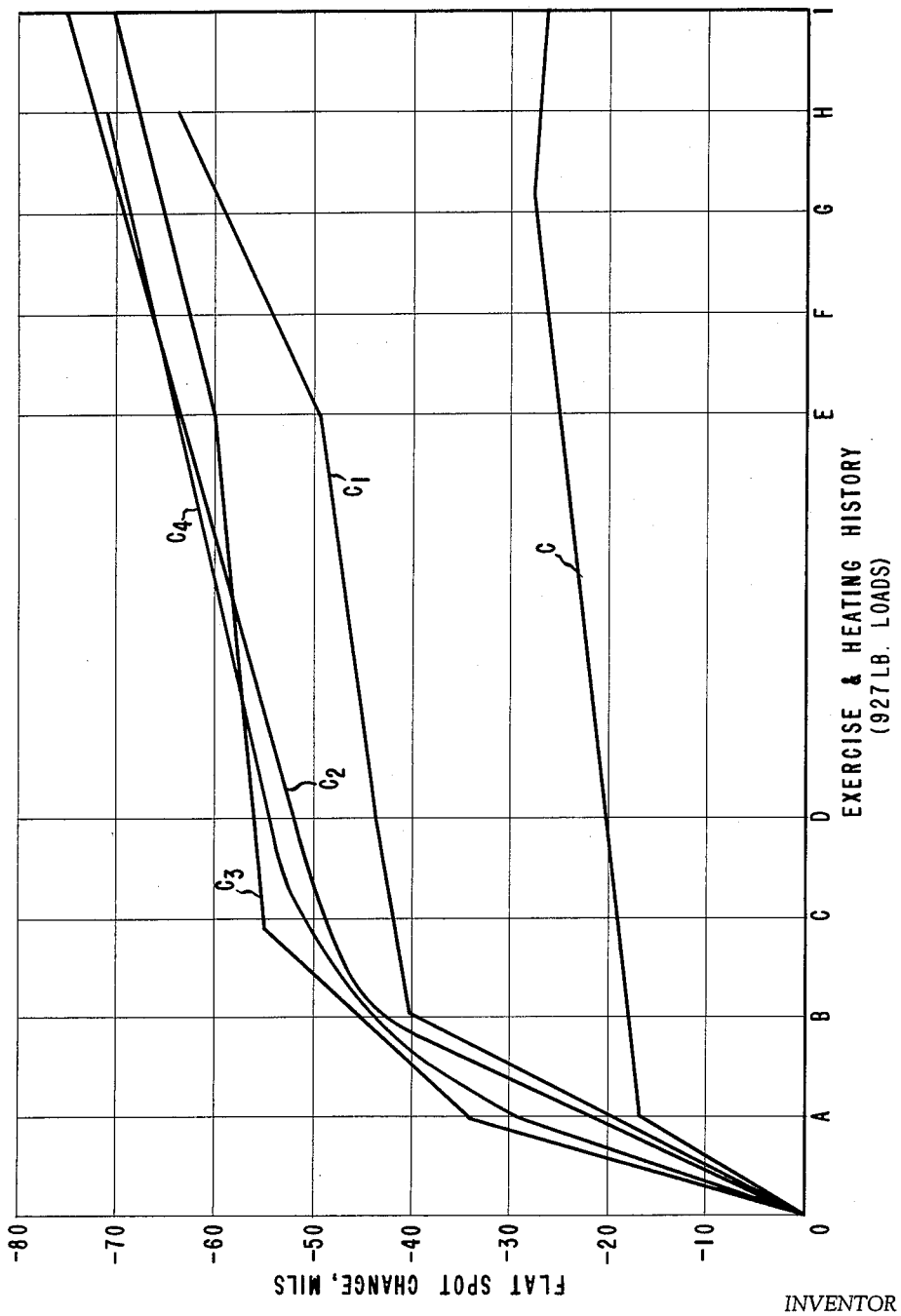

United States Patent Office 3,220,456
Patented Nov. 30, 1965

3,220,456
FLAT SPOT RESISTANT PNEUMATIC TIRE
Lavern James Ahles, Meadowood, Newark, Del., assignor to E. I. du Pont de Nemours and Company, Wilmington, Del., a corporation of Delaware
Filed Oct. 14, 1963, Ser. No. 316,029
12 Claims. (Cl. 152—330)

This invention relates generally to pneumatic tires and, more particularly, to a nylon-reinforced tire with substantially reduced flat-spotting properties.

Nylon tire cords owe their wide-spread acceptance to the superior service they give under heavy loads, at high speeds, and to their bruise and impact resistance. However, tires reinforced with conventional nylon cords, for example, polyhexamethylene adipamide, exhibit a temporary phenomenon known as "flat spotting," i.e. a flatness develops on the tire surface in contact with the road as the tire stands still and cools after use. When the tire is again placed in use, this flatness persists temporarily and a thumping sound is audible. This phenomenon has been attributed at least in part to such visco-elastic properties as the relatively low dimensional stability, low modulus, and high growth of conventional polyamide yarns.

An object of the present invention is to provide a nylon-reinforced tire which does not flat spot even after prolonged storage.

Another object is to provide a process for treating a tire having nylon cords in the carcass to reduce flat spotting tendencies.

These and other objects will become apparent in the course of the following specification and claims.

In accordance with the present invention a process is provided which comprises contacting the hollow chamber presented by a pneumatic tire casing with a desiccant and sealing the said hollow chamber containing the said desiccant. The process provides an article of commerce comprising a pneumatic tire casing presenting a hollow chamber, means to seal the said chamber and desiccant means within the said chamber to provide an atmosphere of low moisture content.

The invention will be more readily understood by reference to the drawings. FIGURE I is a series of curves wherein flat spotting measured in mils at 170° F. as ordinate is plotted against a series of consecutive cycles of exercise and heating as abscissa, the points A, B, C, D, F, G, H, and I representing two hours exercising at 70 m.p.h. under the loads indicated followed by two hours heating at 190° F. (point E representing eight hours exercising and two hours heating under the same conditions). FIGURE II is a series of curves wherein the reduction in flat spotting in mils is plotted as ordinate against the same abscissa as in FIGURE I.

The following examples are cited to illustrate the invention. They are not intended to limit it in any manner. Where flat-spot depth is reported, the value is obtained by measuring with an Ames gauge the unloaded out-of-roundness in mils of a tire heated to 170° F. Then the heated tire is loaded against a flat surface with 90% of the maximum permissible load specified in the 1962 Yearbook of the Tire and Rim Association, 2001 First National Tower, Akron 8, Ohio, and allowed to cool for two hours. The out-of-roundness is measured again and corrected for the over-all shrinkage of the tire. The difference between the two values is the flat-spot depth. In actual practice, riding characteristics are acceptable with a flat-spot depth of less than 160 mils. Preferably this depth does not exceed 140 mils.

EXAMPLES 1–9

In each of Examples 1 to 9 the tire as identified in Table I is mounted on a tire rim and is inflated to 22 p.s.i.g. pressure. Where a desiccant is employed it is placed in the air cavity of the tire prior to mounting. Where the desiccant is solid it is attached in cheesecloth bags equally distributed around the rim. All the tires used in these examples are tubeless pneumatic tires having a bias carcass. The nature of the cord in each tire is indicated by code in Table I, the code designation being identified in Table II. The results are plotted in the curves of FIGURES I and II, the curves relating to each tire being identified in Table I. The improvement obtained following the process of the present invention is obvious from an inspection of the curves.

*Table I*

| Ex. | Curve | Tire | Cord [1] | Desiccant |
|---|---|---|---|---|
| 1 | A | 4 ply, 8.50–14 | 66/6tI (80/20) | None. |
| 2 | A₁ | 4 ply, 8.50–14 | 66/6tI (80/20) | 1 lb. anhy. calc. sulf. |
| 3 | B | 2 ply, 8.00–14 | 66/6I (80/20) | None. |
| 4 | B₁ | 2 ply, 8.00–14 | 66/6I (80/20) | 1 lb. anhy. calc. sulf. |
| 5 | C | 2 ply, 7.50–14 | 66/6I (80/20) | None. |
| 6 | C₁ | 2 ply, 7.50–14 | 66/6I (80/20) | 1 lb. silica gel. |
| 7 | C₂ | 2 ply, 7.50–14 | 66/6I (80/20) | 1 lb. anhy. calc. sulf. |
| 8 | C₃ | 2 ply, 7.50–14 | 66/6I (80/20) | 1 pt. diethyleneglycol. |
| 9 | C₄ | 2 ply, 7.50–14 | 66/6I (80/20) | 1 pt. tetraethyleneglycol. |

[1] Figure in parenthesis indicates parts by weight of melt blend of the indicated components.

*Table II*

| Code Symbol | Polymer Identity |
|---|---|
| 66 | Polyhexamethylene adipamide. |
| 6tI | Polyhexamethylene t-butyl isophthalamide. |
| 6I | Polyhexamethylene isophthalamide. |

EXAMPLE 10

This example illustrates the observation that the flat spotting tendency of a nylon cord tire tends to increase upon storage of the tire unless treated in accordance with the process of the present invention. In this example a four-ply, bias-carcass, tubeless pneumatic tire of size 8.50–14, reinforced with relatively dry cords fabricated (under conditions of less than 20% relative humidity) with filaments spun from an 80/20 blend by weight of polyhexamethylene adipamide/polyhexamethylene isophthalamide is determined to have a flat spot of 128 mils. After unmounted storage for 100 days at 90° F. and 80% relative humidity, it has a flat spot of 165 mils. Two pounds of highly porous, granular structured, anhydrous calcium sulfate is poured into the air cavity of the tire, it is mounted on a tire rim, inflated to 22 p.s.i.g. pressure and exercised by rotation at 65 m.p.h. for 1500 miles against a smooth surface with the tire carrying a load of 1085 pounds. Thereafter the tire has a flat spot of 125 mils. A comparative control tire of the same construction with an initial flat spot of 128 mils has a flat spot of 163 mils after the unmounted storage period. After mounting, inflating and exercising in the manner of the illustrative embodiment, without the calcium sulfate, the control tire has a flat spot of 157. The tires are then stored mounted for the period of days noted in Table III. Periodic flat spot determinations are made with results presented in the table. Before each determination the tires are exercised about 1½ hours.

*Table III*

| Days Storage | Processed Tire | Control |
|---|---|---|
| 10 | 123 | 163 |
| 18 | 120 | 151 |
| 28 | 120 | 165 |
| 40 | 114 | 172 |
| 58 | 121 | 176 |

EXAMPLE 11

This example illustrates the retention of resistance to flat spotting of a tire treated in accordance with the present invention under conditions of actual use. In this example a four-ply, bias-carcass, tubeless pneumatic tire of size 7.50–14 reinforced with cords fabricated (under conditions of high relative humidity) with filaments spun from polyhexamethylene adipamide is determined to have a flat spot of 208 mils. One pound of highly porous, granular structured, anhydrous calcium sulfate is placed in the air cavity and the tire is mounted on a tire rim, inflated to 22 p.s.i.g. pressure, and thereafter placed in an oven at 190° F. for 36 hours. The tire then has a flat spot of 136 mils. Thereafter the tire is dismounted, the anhydrous calcium sulfate is removed and is replaced by 250 milliliters of tetraethylene glycol. This tire is then remounted on its rim and placed into service on a passenger car for 29 days. At the end of this period the tire has a flat spot of 135 mils.

EXAMPLE 12

A tire of the structure of Example 10, but containing an innerliner of chlorobutyl rubber (a rubber composition which resists passage of air providing a particularly leak-proof tire) is observed to have a flat spot of 197 mils. One pound of anhydrous calcium sulfate is provided in the air cavity. The tire is mounted, inflated and exercised in accordance with the procedure described in Examples 1–9. At the end of the cycle the tire is observed to have a flat spot of 137 mils. Although the process of the present invention is more effective in reducing the flat spot of tires whose innerliner do not resist the passage of air, this example shows that the invention may be advantageously used on tires with an air barrier innerliner.

EXAMPLE 13

Extended exposure to a relatively high temperature (from about 180° to about 200° F.) of a tire containing desiccant sealed in its air cavity can be used to greatly reduce the flat spotting tendency. To illustrate this two tires of the structure of Examples 5–9, having initial flat spots of 166 mils and 164 mils respectively, are mounted, each with one pound of anhydrous calcium sulfate in its air cavity, inflated to 24 p.s.i.g. pressure and heated for 36 hours at 190° F. The flat spots of the tires so treated are 78 mils and 84 mils respectively. Two other tires of the same construction are dissected to determine the moisture content of the cord and the skim rubber; one of the dissected tires being as received, the other being dissected after the tire had been subjected to the heating process described above. The results are reported in Table IV. As is apparent from the foregoing, the desiccant occupies only a relatively small portion of the hollow chamber of the pneumatic tires. For example, in Example 6 one pound of silica gel (approximate volume 10 cu. in.) occupies about 0.47% of the volume of the hollow chamber (approximately 2100 cu. in.) presented by a 7.50–14 tubeless tire inflated to 22 p.s.i.g. In Example 10, two pounds of anhydrous calcium sulfate (approximate volume 60 cu. in.) occupies about 2.4% of the volume of the hollow chamber (approximate volume 2550 cu. in.) presented by a 8.50–14 tubeless tire inflated to 22 p.s.i.g.

*Table IV*

| | Unprocessed Tire, percent | Processed Tire, percent |
|---|---|---|
| Cord | 1.5 | 0.5 |
| Skim | 0.3 | 0.1 |

While applicant does not wish to be bound by any theory, it appears that tendency to flat spot is related to the moisture content of the cord.

In addition to tires containing those cords specifically illustrated above, tires containing cords produced from poly-caproamide may be employed. Any desiccant, whether liquid, solid or gaseous is suitable. When the desiccant becomes saturated with moisture it may be replaced with a new desiccant. The desiccant may be placed in the tire cavity either separate or along with the air that inflates the tire.

The preferred process for providing a pneumatic tire with low flat spot according to this invention is heating a mounted tire with a desiccant in the tire cavity. Some reduction in flat spot may be attained by storing the mounted tire at room temperature, but at very low relative humidity, with the desiccant in the tire cavity. Exercising and/or heating tires with desiccant in the air cavity is effective regardless of past storage conditions, and the desiccant in the air cavity can be renewed as needed.

It is apparent that other variations and modifications in the tire, and in the procedures followed, may be adapted without departing from the spirit of the present invention, which is therefore intended to be limited only by the scope of the appended claims.

What is claimed is:

1. A cord reinforced pneumatic tire having reduced flat-spotting tendencies which comprises cord formed from a high molecular weight polycarbonamide wherein the recurring carbonamide linkages are an integral part of the polymer chain, from the class consisting of (A) polycaproamide, (B) polyhexamethylene adipamide, (C) a melt blend of (a) polyhexamethylene adipamide and (b) polyhexamethylene isophthalamide and (D) a melt blend of (a) polyhexamethylene adipamide and (b) polyhexamethylene-t-butyl isophthalamide, the casing of the said tire presenting a hollow chamber, said hollow chamber having therein air under pressure together with a relatively small amount in relation to the volume of said hollow chamber of desiccant means, and means to seal the said hollow chamber from contact with the atmosphere.

2. The tire of claim 1 wherein the flat-spot depth does not exceed 160 mils.

3. The tire of claim 1 wherein the said polycarbonamide is polyhexamethylene adipamide.

4. The tire of claim 1 wherein the said polycarbonamide is a melt blend of polyhexamethylene adipamide and polyhexamethylene isophthalamide.

5. The tire of claim 1 wherein the said polycarbonamide is a melt blend of polyhexamethylene adipamide and polyhexamethylene-t-butyl isophthalamide.

6. A cord reinforced pneumatic tire having reduced flat-spotting tendencies which comprises cord formed from a high molecular weight polycarbonamide wherein the recurring carbonamide linkages are an integral part of the polymer chain, from the class consisting of (A) polycaproamide, (B) polyhexamethylene adipamide, (C) a melt blend of (a) polyhexamethylene adipamide and (b) polyhexamethylene isophthalamide and (D) a melt blend of (a) polyhexamethylene adipamide and (b) polyhexamethylene-t-butyl isophthalamide, the casing of the said tire presenting a hollow chamber, said hollow chamber having therein air under pressure together with from 0.47% to about 2.4% by volume of said hollow chamber of desiccant means, and means to seal the said hollow chamber from contact with the atmosphere.

7. The tire of claim 6 wherein the flat-spot depth does not exceed 160 mils.

8. The tire of claim 6 wherein the said polycarbonamide is polyhexamethylene adipamide.

9. The tire of claim 6 wherein the said polycarbonamide is a melt blend of polyhexamethylene adipamide and polyhexamethylene isophthalamide.

10. The tire of claim 6 wherein the said polycarbonamide is a melt blend of polyhexamethylene adipamide and polyhexamethylene-t-butyl isophthalamide.

11. A process for reducing flat-spotting in a cord reinforced pneumatic tire, the said cord being formed from a high molecular weight polycarbonamide wherein the recurring carbonamide linkages are an integral part of the polymer chain selected from the class consisting of (A) polycaproamide, (B) polyhexamethylene adipamide, (C) a melt blend of (a) polyhexamethylene adipamide and (b) polyhexamethylene isophthalamide and (D) a melt blend of (a) polyhexamethylene adipamide and (b) polyhexamethylene-t-butyl isophthalamide, the casing of the said tire presenting a hollow chamber substantially filled with air under pressure, said process comprising introducing into the hollow chamber presented by said casing a dessiccant which occupies a relatively small amount of the volume of said hollow chamber, and then sealing said hollow chamber.

12. A process for reducing flat-spotting in a cord reinforced pneumatic tire, the said cord being formed from a high molecular weight polycarbonamide wherein the recurring carbonamide linkages are an integral part of the polymer chain selected from the class consisting of (A) polycaproamide, (B) polyhexamethylene adipamide, (C) a melt blend of (a) polyhexamethylene adipamide and (b) polyhexamethylene isophthalamide and (D) a melt blend of (a) polyhexamethylene adipamide and (b) polyhexamethylene-t-butyl isophthalamide, the casing of the said tire presenting a hollow chamber substantially filled with air under pressure, said process comprising introducing into the hollow chamber presented by said casing a desiccant which occupies from about 0.47% to about 2.4% of the volume of said hollow chamber, and then sealing said hollow chamber.

References Cited by the Examiner
UNITED STATES PATENTS

| | | | |
|---|---|---|---|
| 2,109,383 | 2/1938 | Gallardo | 152—330 |
| 2,991,818 | 7/1961 | Gay et al. | 152—359 X |

ARTHUR L. LA POINT, *Primary Examiner.*